(12) United States Patent
Barciet

(10) Patent No.: US 10,683,890 B2
(45) Date of Patent: Jun. 16, 2020

(54) ROLLER BEARING FOR SUPPORTING RADIAL DEFORMATION OF THE ROLLER BEARING AND ROTATIVE ASSEMBLY COMPRISING SUCH ROLLER BEARING

(71) Applicant: Aktiebolaget SKF, Gothenburg (SE)

(72) Inventor: Damien Barciet, Avallon (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/278,229

(22) Filed: Feb. 18, 2019

(65) Prior Publication Data

US 2019/0323553 A1   Oct. 24, 2019

(30) Foreign Application Priority Data

Apr. 20, 2018   (DE) .................. 10 2018 206 065

(51) Int. Cl.
| | |
|---|---|
| *F16C 19/28* | (2006.01) |
| *F16C 19/34* | (2006.01) |
| *F16C 19/38* | (2006.01) |
| *F16C 33/58* | (2006.01) |
| *F16C 19/54* | (2006.01) |

(52) U.S. Cl.
CPC .............. *F16C 19/28* (2013.01); *F16C 19/34* (2013.01); *F16C 19/381* (2013.01); *F16C 19/545* (2013.01); *F16C 33/583* (2013.01); *F16C 2300/14* (2013.01)

(58) Field of Classification Search
CPC .......... F16C 19/28; F16C 19/30; F16C 19/34; F16C 19/381; F16C 19/545; F16C 33/583; F16C 35/06; F16C 2300/14; B21B 31/00

USPC ................ 384/452, 455, 549–550, 569–570, 384/618–619, 622
See application file for complete search history.

(56) References Cited

U.S. PATENT DOCUMENTS

| | | | | |
|---|---|---|---|---|
| 4,573,811 | A * | 3/1986 | Andree ................. | F16C 19/181 384/622 |
| 5,893,784 | A * | 4/1999 | Boatman ............... | B63B 21/507 441/3 |
| 6,454,074 | B1 * | 9/2002 | Kundermann .......... | F16D 21/06 192/106 F |
| 8,540,092 | B2 * | 9/2013 | Roodenburg ........... | B66C 23/52 212/253 |
| 9,291,014 | B2 * | 3/2016 | Derrer .................... | E21B 21/02 |

(Continued)

FOREIGN PATENT DOCUMENTS

| | | | | |
|---|---|---|---|---|
| CA | 2883865 A1 * | 9/2015 | ........... | B63B 21/507 |
| DE | 202013009246 U1 * | 2/2015 | ............ | F16C 35/061 |

(Continued)

*Primary Examiner* — Marcus Charles
(74) *Attorney, Agent, or Firm* — Garcia-Zamor Intellectual Property Law, LLC; Ruy Garcia-Zamor; Bryan Peckjian

(57) ABSTRACT

A roller bearing having a rotatable first ring and a non-rotatable second ring arranged concentrically, the second ring having a circumferential groove opening towards the first ring into which is arranged a protruding element, between which are arranged a single first radial roller bearing and two axial roller bearings spaced apart in the axial direction respectively on opposite radial faces of the protruding element. The roller bearing includes a plurality of circumferentially spaced apart second radial roller bearings secured to the rotatable first ring.

8 Claims, 2 Drawing Sheets

(56) References Cited

U.S. PATENT DOCUMENTS

| | | | | |
|---|---|---|---|---|
| 9,605,709 B2* | 3/2017 | Kaesler | ............ | F16C 19/381 |
| 9,784,308 B2* | 10/2017 | Fiesel | ............ | F16C 35/061 |
| 10,054,157 B2* | 8/2018 | Fiesel | ............ | F16C 35/061 |
| 2010/0012010 A1* | 1/2010 | Gooijer | ............ | B63B 21/50 |
| | | | | 114/230.1 |
| 2016/0245333 A1* | 8/2016 | Fiesel | ............ | F16C 35/061 |
| 2016/0368743 A1* | 12/2016 | De Groot | ............ | B66C 23/84 |

FOREIGN PATENT DOCUMENTS

| | | | | |
|---|---|---|---|---|
| EP | 0158015 A2 * | 10/1985 | ............ | F16C 19/181 |
| EP | 0413119 A2 * | 2/1991 | ............ | B66C 23/84 |
| WO | WO-2008058729 A1 * | 5/2008 | ............ | F16C 19/381 |

* cited by examiner

ROLLER BEARING FOR SUPPORTING RADIAL DEFORMATION OF THE ROLLER BEARING AND ROTATIVE ASSEMBLY COMPRISING SUCH ROLLER BEARING

CROSS-REFERENCE

This application claims priority to German patent application no. 102018206065.7 filed on Apr. 20, 2018, the contents of which are fully incorporated herein by reference.

TECHNOLOGICAL FIELD

The present invention relates to the field of rolling bearings for absorbing axial and radial forces and having a first bearing ring and a second bearing ring arranged concentrically about an axis of rotation running in an axial direction.

BACKGROUND

The invention relates more particularly to the field of large-diameter cylindrical roller bearings, notably those used in a tunnel boring machine, or in the field of defense such as radars, char, or excavator applications. Large-diameter roller bearings may also be used for the mounting of rotor blades on wind turbines. Also, large-diameter roller bearing and slewing bearings are used in cranes.

A large-diameter rolling bearing comprises generally two concentric inner and outer rings, and a bearing assembly comprising two rows of axial bearing rollers and one row of radial bearing rollers. Such rolling bearings are generally loaded, both axially and radially, often with a relatively strong load.

Depending on the use of cylindrical roller bearing, considerable forces may arise, which may cause deformation of the bearing, notably of the rotating ring, leading in some cases, to locally separate the rings.

Reference can be made to document EP 2 092 204 B1 which describes a cylindrical roller bearing having two opposite rows of radial cylindrical rollers and two opposite rows of axial cylindrical rollers disposed in such a way to surround a nose ring of a rotating ring.

However, radial dimension of such roller bearing is considerably increased. Furthermore, it is not possible to add the fourth row of cylindrical rollers on existing structure without proceeding to important modifications.

One aim of the present invention is to overcome these drawbacks.

SUMMARY

It is a particular object of the present invention to provide a rolling bearing capable of absorbing axial and radial loads as well as supporting radial deformation which may occur under high radial loads, while being compact notably in radial direction.

In one embodiment, a roller bearing comprises a rotatable first ring and a non-rotatable second ring which are arranged concentrically about a first rotation axis running in an axial direction, the rotatable first ring being configured to rotate with respect to the non-rotatable second ring around the first rotation axis.

The non-rotatable second ring comprises a circumferential groove opening in a radial direction towards the rotatable first ring into which is arranged a protruding element or lobe of the rotatable first ring extending towards the non-rotatable second ring.

Between the protruding element and the circumferential groove there is arranged at least one first radial roller bearing having a row of radial cylindrical rollers having a rotation axis parallel to the rotation axis of the roller bearing, and at least two axial roller bearings each having a row of axial cylindrical rollers spaced apart in the axial direction respectively on opposite radial faces of the protruding element.

The roller bearing further comprises a plurality of circumferentially spaced apart second radial roller bearings rotatably secured to the rotatable first ring.

For instance, known SKF support rollers, such as for example NUTR 20A, can be used to form these second radial roller bearings.

In case of radial deformation of the rotatable ring, the second radial roller bearings come into radial contact with a surrounding housing avoiding the rotatable ring to be locally separated in an outward direction from the non-rotatable ring.

Alternatively, in another embodiment, even in absence of radial deformation of the rotatable ring, the second radial roller bearings may be permanent radial contact with the surrounding housing.

In another embodiment, the roller bearing further comprises an axial projection extending towards the rotatable ring.

In an embodiment, the axial projection is separated from the outer cylindrical surface of the outer rings of each second radial roller bearings by a radial gap, the radial gap being configured in a such a way that the second radial roller bearings come in radial contact with the projection under radial load of the roller bearing leading to deformation of the rotatable first ring.

Under no load conditions, there is, in this embodiment, a radial gap between the axial projection and the outer cylindrical surface of the outer rings of each second radial roller bearing; there is thus no radial contact with the projection.

Under load conditions the outer cylindrical surface of the outer rings of the second radial roller bearings are in radial contact with the projection.

In another embodiment, the axial projection is in permanent radial contact with the outer rings of each second radial roller bearing, even in absence of radial load of the roller bearing. In other words, there is no radial gap between the axial projection and the outer cylindrical surface of the outer rings of each second radial roller bearing.

Under no load conditions, there is, in this embodiment, no radial gap between the axial projection and the outer cylindrical surface of the outer rings of each second radial roller bearing.

Under load conditions the outer cylindrical surface of the outer rings of the second radial roller bearings are in radial contact with the projection. In other words, in both conditions, there is a radial contact between the outer cylindrical surface of the outer rings of the second radial roller bearings and the projection.

The second radial roller bearings are thus configured to support radial deformation of the rotatable ring.

Thanks to the second radial roller bearings and the axial projection, the rotatable first ring, in this case the outer ring, cannot be locally separated in an outward direction from the non-rotatable inner ring in case of deformation of the rotatable ring.

The rotation axis of the second radial roller bearings are each offset compared to the axis of the raceway of the axial projection.

Advantageously, each second radial roller bearing comprises an outer ring, an inner ring arranged concentrically about a second rotation axis running in an axial direction offset from the first axis of rotation.

Each radial roller bearing further comprises at least one row of rollers provided between raceways respectively of the inner cylindrical surface of the outer ring and the outer cylindrical surface of the inner ring.

Each second radial roller bearing is, for example, secured to the rotatable first ring by a stud rotatably secured to the inner ring, for example by force fitting, and screwed in the rotatable first ring, notably on a lower radial surface.

The outer rings are thus not in direct contact with the studs, since rollers and the inner rings mobile compared to the outer rings are disposed between the outer rings and the studs.

Known SKF support rollers, such as for example NUTR 20A, can be used to form the second radial roller bearings.

For example, the second radial roller bearings are arranged on at least one circumferential portion of the rotatable ring, notably on the portion more subjected to radial deformation. For example, the circumferential portion of the rotatable ring is comprised between 15° and 120°, for example equal to 90°.

Alternatively, the second radial roller bearings could be arranged on the whole circumference of the rotatable ring.

The rotatable ring is, for example, made of a single part forming a toothing ring.

The rotatable ring may be divided in the axial direction in two parts, a support part to which is secured the second radial roller bearings and a holding part secured to the support part and adapted to be secured to a rotating component on a side opposite to the second radial roller bearings.

Advantageously, the rotatable first ring is adapted to be secured to a rotating component on a side opposite to the second radial roller bearings.

In one embodiment, the rotatable first ring is the outer ring and the non-rotatable second ring is the inner ring.

As an alternative, the rotatable first ring could be the inner ring whereas the non-rotatable second ring could be the outer ring.

In case the rotatable first ring is the outer ring, the circumferential groove opens in a radial direction outwardly towards the rotatable first ring and the lobe projects radially towards the non-rotatable second ring.

In one embodiment, the non-rotatable ring comprises the axial projection axially extending towards the rotatable ring.

The non-rotatable ring is, for example, divided in the axial direction in a first part, a second part and a third part adapted to be secured to a fixed component, the third part having the axial projection.

The inner cylindrical surface of the axial projection acts as a raceway for the outer rings of the second radial roller bearings.

The axes of the second radial roller bearings are each offset compared to the axis of the raceway of the axial projection.

The cylindrical rollers are, for example, arranged in a depression of the groove. Alternatively, a corresponding depression may also be provided in the end surface of the protruding element. The first radial cylindrical rollers roll between raceways provided respectively on the groove and the protruding element. The rotation axis of the first radial roller bearing is coaxial with the rotation axis.

The cylindrical rollers of the first axial roller bearing have a rotation axis perpendicular to the rotation axis of the roller bearing. The outer cylindrical surface of each first axial cylindrical roller rolls between raceways provided respectively on the groove and the protruding element. The cylindrical rollers of the second axial roller bearing have a rotation axis perpendicular to the rotation axis of the roller bearing. The outer cylindrical surface of each second axial cylindrical roller rolls between raceways provided respectively on the groove and the protruding element.

BRIEF DESCRIPTION OF THE DRAWINGS

According to another aspect, the invention concerns a rotative assembly comprising a rotating component, a non-rotating component and a roller bearing as describes above.

The present invention and its advantages will be better understood by studying the detailed description of specific embodiments given by way of non-limiting examples and illustrated by the appended drawings on which.

DETAILED DESCRIPTION

Figure 1:
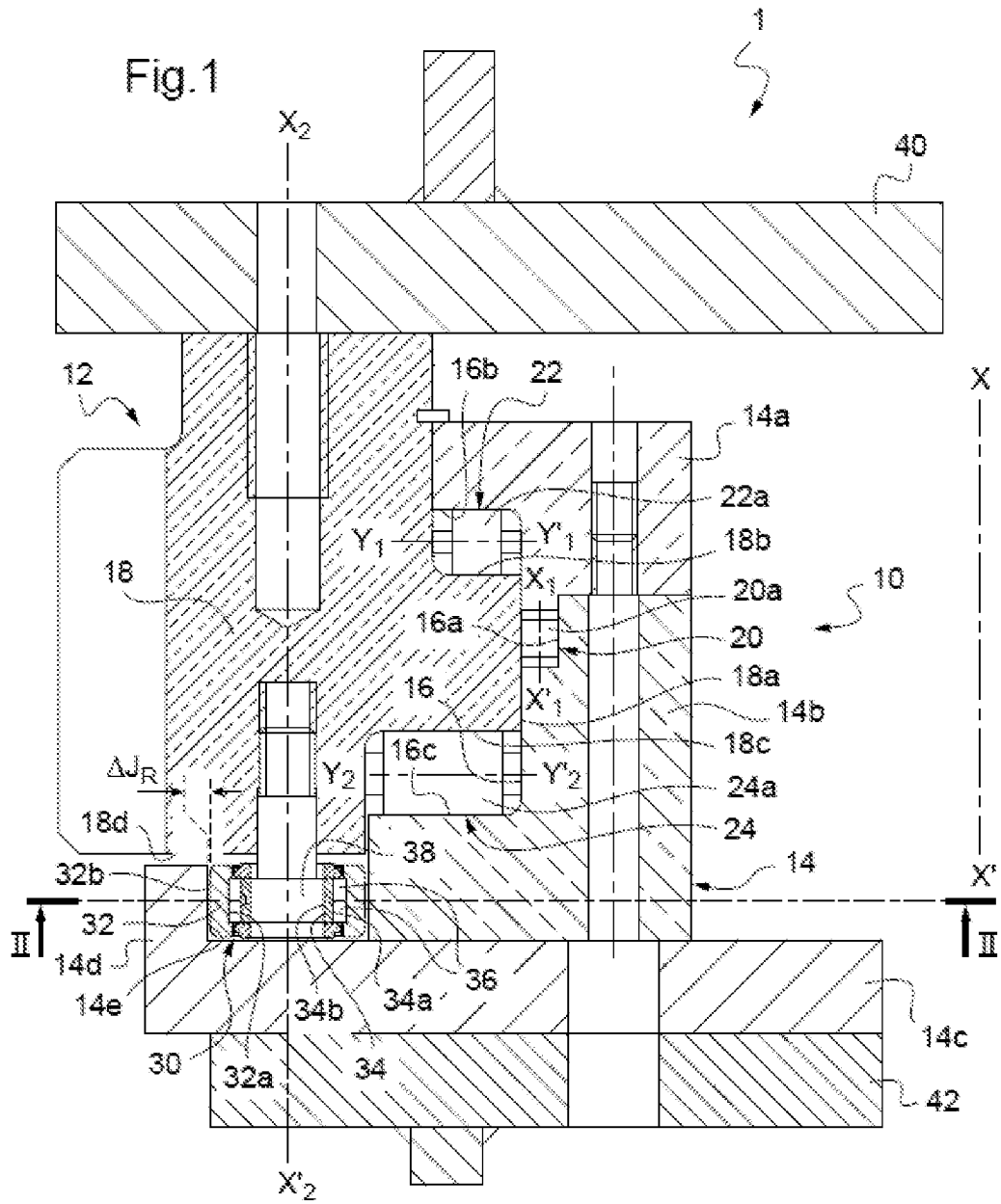
FIG. 1 is a partial cross section of a rotative assembly having a roller bearing according to first embodiment of the invention.
Figure 2:
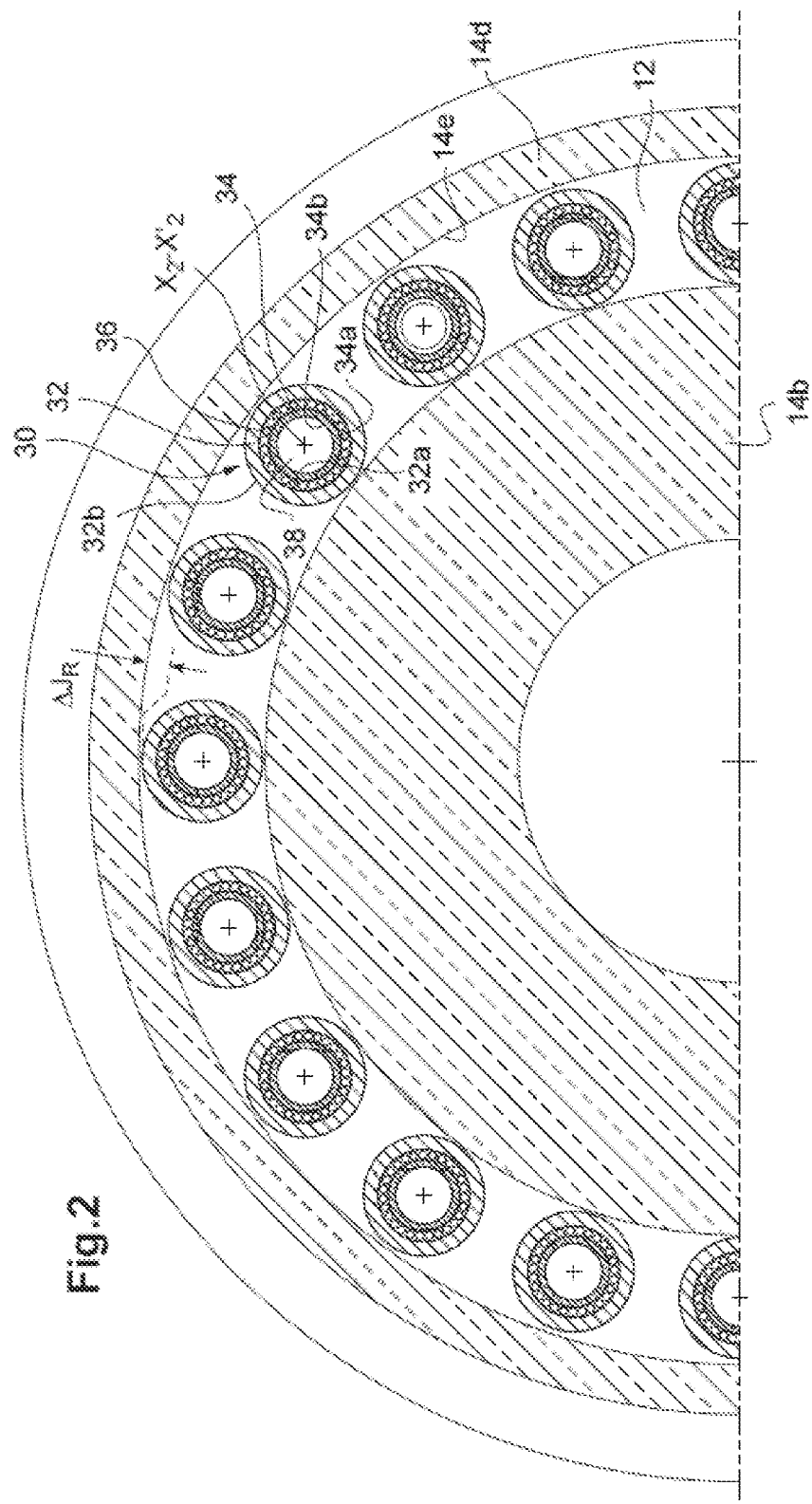
FIG. 2 is a schematic cross section of the roller bearing along line II-II of FIG. 1.

An embodiment of a rotative assembly 1 is illustrated on FIGS. 1 and 2, the assembly 1 may for example be used in a tunnel boring machine, an oil pumping installation, a crane, or any other applications using a large diameter rolling bearing.

The rotative assembly 1 comprises roller bearing 10 having a rotatable first ring 12 and a non-rotatable second ring 14 which are arranged concentrically about a first rotation axis X-X' running in an axial direction. The rotatable first ring 12 is configured to rotate with respect to the non-rotatable second ring 14 around the rotation axis X-X'.

As illustrated, the rotatable first ring 12 is the outer ring of the rotative assembly whereas the non-rotatable second ring 14 is the inner ring of the roller bearing 10. As an alternative, the rotatable first ring could be the inner ring of the rotative assembly whereas the non-rotatable second ring could be the outer ring of the rotative assembly.

The non-rotatable second ring 14 has a circumferential groove 16 opening in a radial direction outwardly towards the rotatable first ring 12.

The rotatable first ring 12 comprises a protruding element or lobe 18 extending towards the non-rotatable second ring 14 and arranged in the circumferential groove 16 of the non-rotatable second ring 14.

Between the lobe 18 and the groove 16 there is arranged a single first radial roller bearing 20 having a row of radial cylindrical rollers 20a having a rotation axis X1-X1' parallel to the first rotation axis X-X' of the roller bearing 10. The rollers 20a are in this case arranged in a depression 16a of the groove 16. Alternatively, a corresponding depression may also be provided in the end surface 18a of the lobe 18. The first radial rollers 20a roll between raceways 16a, 18a provided respectively on the groove 16 and the lobe 18. The rotation axis of the first radial roller bearing 20 is coaxial with the rotation axis X-X'. The end surface 18a of the lobe 18 forms a raceway for the first radial rollers 20a.

Two axial roller bearings 22, 24 each having a row of axial cylindrical rollers 22a, 24a spaced apart in the axial direction respectively on opposite radial faces 18b, 18c of the lobe 18.

The cylindrical rollers 22a of the first axial roller bearing 22 have a rotation axis Y1-Y1' perpendicular to the rotation axis X-X' of the roller bearing 10. The outer cylindrical surface of each first axial cylindrical roller 22a rolls between raceways 16b, 18b provided respectively on the groove 16 and the lobe 18. The first radial face 18b of the lobe 18 forms a raceway for the first axial cylindrical roller 22a. The cylindrical rollers 24a of the second axial roller bearing 24 have a rotation axis Y2-Y2' perpendicular to the rotation axis X-X' of the roller bearing 10. The outer cylindrical surface of each second axial cylindrical roller 24a rolls between raceways 16c, 18c provided respectively on the groove 16 and the lobe 18. The second radial face 18b of the lobe 18 forms a raceway for the second axial cylindrical roller 24a.

The roller bearing 10 comprises a plurality of circumferentially spaced apart second radial roller bearings 30 secured to the rotatable first ring 12. Each second radial roller bearings 30 comprises an outer ring 32 and an inner ring 34 arranged concentrically about a rotation axis X2-X2' running in an axial direction parallel to the axis of rotation X-X' of the roller bearing 10. Two rows of rollers 36 are provided between raceways 32a, 34a respectively of the inner cylindrical surface of the outer ring 32 and the outer cylindrical surface of the inner ring 34. The inner ring 34 is rotatably secured, for example by force fitting, to a stud 38 screwed in the rotatable first ring 12, notably on a lower radial surface 18d. The outer rings 32 are thus not in direct contact with the studs 38, since rollers 36 and the inner rings 34 mobile compared to the outer rings 32 are disposed between the outer rings 32 and the studs 38.

As can be seen on FIG. 2, the second radial roller bearings 30 are arranged on at least one circumferential portion of the rotatable outer ring 12, notably on the portion more subjected to radial deformation. As a non-limiting example, the circumferential portion of the rotatable ring is equal to 100° and comprises seven spaced apart second radial roller bearings 30.

Alternatively, the second radial roller bearings 30 could be arranged on a circumferential portion of the rotatable ring comprised between 15° and 120° or on the whole circumference of the rotatable ring 12.

The second radial roller bearings 30 act as support radial rollers.

As shown on FIG. 1, the rotatable first ring 12 is made in a single part forming a toothing ring and secured at one end to a rotating component 40, on a side opposite to the second radial roller bearings 30. As an alternative, the rotatable first ring 12 could be divided in the axial direction in a plurality of parts.

As shown on FIG. 1, the non-rotatable second ring 14 is divided in the axial direction in three parts, each having an L-shape in cross-section: a first part 14a, a second part 14b secured between the first part 14a and a third part 14c. The third part 14c is secured to a fixed component 42.

The third part 14c comprises an axial projection 14d extending towards the rotatable first ring 12.

As illustrated in the embodiment of FIGS. 1 and 2, the axial projection 14d is separated from the outer cylindrical surface 32b of the outer rings 32 of each second radial roller bearings 30 by a radial gap $\Delta J_R$ under no load conditions. The radial gap $\Delta J_R$ is configured in a such a way that the second radial roller bearings 30 come in radial contact with the projection 14d under radial load of the roller bearing 10 leading to deformation of the rotatable first ring 12.

In other words, the outer cylindrical surface 32b of the outer rings 32 of the second radial roller bearings 30 bears radially on an inner cylindrical surface 14e the axial projection 14d in case of radial deformation of the rotatable ring 12.

The inner cylindrical surface 14e of the axial projection 14d acts as a raceway for the outer rings 32 of the second radial roller bearings 30. The axis X2-X2' of the second radial roller bearings 30 are each offset compared to the axis of the raceway 14e of the axial projection 14d.

Under no load conditions, there is, in this embodiment, a radial gap $\Delta J_R$ between the inner cylindrical surface 14e of the axial projection 14d and the outer cylindrical surface 32b of the outer rings 32 of the second radial roller bearings 30; there is thus no radial contact with the projection 14d. Under load conditions, such as radial load of the roller bearing leading to a radial deformation of the rotatable first ring 12, the outer cylindrical surface 32b of the outer rings 32 of the second radial roller bearings 30 come in radial contact with the inner cylindrical surface 14e of the axial projection 14d.

The invention is not limited to presence of a radial gap between the axial projection 14d and the second radial roller bearings 30. Indeed, as an alternative, the axial projection 14d may be in permanent radial contact with the outer cylindrical surface 32b of the outer rings 32 of each second radial roller bearing 30, even in absence of radial load of the roller bearing. This is the case, for example, when a minimum deformation of the rotatable ring is desired, then this radial gap $\Delta J_R$ under no load conditions equals zero.

In this alternative, in both conditions, there is a radial contact between the outer cylindrical surface 32b of the outer rings 32 of the second radial roller bearings 30 and the axial projection 14d.

Thanks to the second radial roller bearings, the rotatable outer ring cannot be locally separated in an outward direction from the non-rotatable inner ring in case of radial load leading to radial deformation of the rotatable outer ring.

What is claimed is:

1. A roller bearing assembly, comprising:
   a rotatable first ring, having a first axial end and a protruding element which extends radially therefrom, the protruding element having opposite radial faces;
   a non-rotatable second ring arranged concentrically about a first rotation axis running in an axial direction, the rotatable first ring configured to rotate with respect to the non-rotatable second ring around the first rotation axis, the non-rotatable second ring having a circumferential groove opening in a radial direction towards the rotatable first ring, the protruding element of the rotatable first ring extending into the circumferential groove opening towards the non-rotatable second ring;
   at least one first radial roller bearing located between the protruding element and the circumferential groove opening, the at least one first radial roller bearing having a row of radial cylindrical rollers;
   at least two axial roller bearings located between the protruding element and the circumferential groove opening, each of the at least two axial roller bearings having a row of axial cylindrical rollers, the at least two axial roller bearings are spaced apart in the axial direction and are located on separate ones of the opposite radial faces of the protruding element;
   a plurality of second radial roller bearings are circumferentially spaced apart and rotatably secured to the first axial end of the rotatable first ring, each of the plurality of second radial roller bearings comprises:
   an outer ring;
   an inner ring arranged concentrically about a second rotation axis running in an axial direction offset from the first axis of rotation;

at least one row of rollers provided between raceways respectively of the inner cylindrical surface of the outer ring and the outer cylindrical surface of the inner ring;

wherein each of the plurality of second radial roller bearings being mounted on a stud which extends axially from the rotatable first ring such that the second bearings are axially spaced from the first axial end of the rotatable first ring, the stud being rotatably secured to the inner ring and fastened in the rotatable first ring.

2. The roller bearing assembly according to claim 1, wherein the roller bearing comprises an axial projection axially extending towards the rotatable ring and radially surrounding the second radial roller bearings.

3. The roller bearing assembly according to claim 2, wherein the axial projection is separated from an outer cylindrical surface of each second radial roller bearings by a radial gap ($\Delta J_R$), the 20 radial gap ($\Delta J_R$) being configured in such a way that the second radial roller bearings come in radial contact with the axial projection under radial load of the roller bearing leading to deformation of the rotatable first ring.

4. The roller bearing assembly according to claim 1, wherein the second radial roller bearings are arranged on a circumferential portion of the rotatable first ring comprised between fifteen degrees (15°) and one hundred twenty degrees (120°).

5. The roller bearing assembly according to claim 1, wherein the rotatable first ring is adapted to be secured to a rotating component on a side opposite to the second radial roller bearings.

6. The roller bearing assembly according to claim 1, wherein the rotatable first ring is the outer ring and the non-rotatable second ring is the inner ring.

7. The roller bearing assembly according to claim 1, wherein the non-rotatable second ring comprises the axial projection axially extending towards the rotatable first ring.

8. The roller bearing assembly according to claim 7, wherein the non-rotatable ring is divided in the axial direction in a first part, a second part and a third part adapted to be secured to a fixed component, the third part having the axial projection.

* * * * *